United States Patent [19]

Thompson

[11] Patent Number: 4,593,369

[45] Date of Patent: Jun. 3, 1986

[54] MONITORING SYSTEM FOR A CONTAINER TESTING MACHINE

[75] Inventor: Roger A. Thompson, Littleton, Colo.

[73] Assignee: Adolph Coors Company, Golden, Colo.

[21] Appl. No.: 457,471

[22] Filed: Jan. 12, 1983

[51] Int. Cl.[4] .............................................. G06F 15/20

[52] U.S. Cl. ...................................... 364/552; 364/478; 377/13; 377/16

[58] Field of Search ............... 364/403, 478, 552, 478, 364/552; 377/13, 16

[56] References Cited

U.S. PATENT DOCUMENTS

| | | | |
|---|---|---|---|
| 3,317,132 | 5/1967 | Martin | 377/13 X |
| 3,593,008 | 7/1971 | De Witt et al. | 364/403 X |
| 3,704,362 | 11/1972 | Kolby et al. | 364/552 |
| 3,733,469 | 5/1973 | Meyer | 377/13 X |
| 4,074,809 | 2/1978 | McMillin et al. | 209/588 |
| 4,135,241 | 1/1979 | Stanis et al. | 364/403 X |
| 4,142,238 | 2/1979 | Brandt et al. | 377/16 X |
| 4,290,141 | 9/1981 | Anderson et al. | 377/13 X |
| 4,366,544 | 12/1982 | Shima et al. | 364/550 |
| 4,511,044 | 4/1985 | Connor et al. | 364/552 X |

*Primary Examiner*—Errol A. Krass
*Assistant Examiner*—Edward R. Cosimano
*Attorney, Agent, or Firm*—Klaas & Law

[57] ABSTRACT

A monitoring device for a can testing machine which provides a visual display on a cathode ray tube identifying potential can production process problems and can testing machine problems. The visual dislay provides a summary of can test data as well as analysis messages. A microcomputer is utilized in conjunction with the can testing machine and logic hardware to perform the summary and analysis functions of the preferred embodiment.

11 Claims, 4 Drawing Figures

MONITORING SYSTEM FOR A CONTAINER TESTING MACHINE

Appendices

Appendix A comprises a documentation of the INTEL iRMX 80 program operating system which is incorporated herein by reference and forms a part of this disclosure for all that it teaches. Available in patented file.

Appendix B comprises a program listing and description of the software of the present invention which is incorporated herein by references and forms a part of this disclosure for all that it teaches. Available in patented file.

BACKGROUND OF THE INVENTION

The present invention pertains generally to measuring and testing systems and more particularly to a monitoring device for a container testing system.

Container testing machines such as the can testing machine disclosed in U.S. Pat. No. 4,074,809 issued to McMillin et al, Feb. 21, 1978, which is incorporated herein by reference and forms a part of this disclosure for all that it teaches, are useful in detecting defects in printed metallic can body members. Can testing devices such as disclosed in the McMillin et al. patent are capable of testing can body members for the presence of printed ink thereon and the presence of defects in the can body member such as cracks, pin holes, etc.

To minimize the scrap rate, i.e., the number of cans rejected by the can testing machine, it is useful to monitor the operation of the can testing machine to identify potential can production process problems and can testing machine problems. For example, it is useful to determine if the can process is producing an excess number of defective cans, in which case the can production process must be checked, or, if some problem within the can testing machine is causing an excess number of rejected cans.

The can testing machine disclosed by McMillin et al in the above referenced U.S. Patent produces control signals representative of detected leaking cans, unpainted cans and empty can pockets within the can testing machine. This can test data is utilized by the can testing machine to perform various control functions. A can test data signal representative of a leaking can or an unpainted can will cause a solenoid to be activated to reject the can into a scrap can box. Detection of an empty can pocket produces a control signal to activate control circuitry within the can testing machine to improve performance of the can testing machine apparatus, as more fully disclosed in U.S. Pat. No. 4,501,366 issued Feb. 26, 1985 by Roger A. Thompson entitled "Photomultiplier Tube Assembly", which is incorporated herein by reference for all that it teaches.

Since the scrap rate has a significant impact upon the economic efficiency of the total can production process, it is useful to determine whether defects have been generated either within the can testing process or in the process of manufacture of the cans. For example, empty can pockets in the can testing machine can result either from track misalignment or production of damaged cans. Similarly, a can will be rejected from the can testing machine in response to an unpainted can signal resulting from a defect in the can painting process or the necessity for adjustment of the unpainted can sensor. Consequently, it is of the utmost importance to determine the nature of the cause of can rejection. If it can be determined, for example, that a flange seal in a particular pocket of the can testing machine is defective, it may be economically justified to stop the can testing machine and repair the flange seal to significantly reduce the scrap rate, especially when it can reasonably be determined that the source of the problem exists in an identified piece of hardware, such as a flange seal in a particular can pocket.

Moreover, it is useful to quantitatively identify the scrap rate as a function of the total number of cans processed. Normally, no quantitative measurement of the number of rejected cans is made. Although it is easy to identify extremely large changes in the scrap rate as a result of a large number of rejected cans, changes in the scrap rate which are not extremely large are many times much more difficult to recognize in the lack of a quantitive measuring device. This is a result of the fact that the can testing machine operates at variable speeds which causes the scrap rate to vary in accordance with the production rate of the machine. Consequently, it is virtually impossible to determine if the scrap rate is acceptable strictly by the quantity of rejected cans deposited in the scrap can box within a specified time interval. Additionally, slow changes in the scrap rate do not present an identifiable increase over an extended period. For example, a four or five fold increase in the scrap rate over a several month period may not trigger a recognizable increase to an employee assigned to empty the rejected can box.

Consequently, it is advantageous to provide a monitoring system for identifying significant changes in scrap rate as well as providing information as to whether the problem exists in the can manufacturing process or within the can testing machine itself, and the nature of the particular problem.

OBJECTS OF THE INVENTION

It is therefore an object of the present invention to provide a device for monitoring a container testing machine.

It is also an object of the present invention to provide a device for monitoring a can testing machine.

Another object of the present invention is to provide a device for monitoring a can testing machine which is useful in reducing scrap rate.

Another object of the present invention is to provide a device for monitoring a can testing machine which is useful in identifying potential can production process problems.

Another object of the present invention is to provide a device for monitoring a can testing machine which is useful in identifying can testing machine problems.

Additional objects, advantages and novel features of the invention are set forth in part in the description which follows and be understood by those skilled in the art upon examination of the following or may be learned by practice of the invention. The objects and advantages of the invention may be realized and obtained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of the present invention in general comprises a monitoring device for a container testing machine which accumulates and analyzes data which is indicative of one or more conditions of the container such as whether the container is leaking, whether the container is painted, and data which is indicative of the operation of the container testing machine such as whether empty can pockets are being detected in the container testing machine. Accumulated and analyzed data is displayed to identify potential container production process problems and container testing machine problems.

The present invention may consequently comprise a monitoring device for a container testing machine comprising data accumulation means for accumulating container test data produced by the container testing machine; data analysis means for analyzing the container test data; display means for displaying accumulated data produced by the data accumulation means and analysis data produced by the data analysis means to identify potential container production process problems and container testing machine problems.

The present invention also comprises a monitoring device for a can testing machine which has a revolving turret with a plurality of can pockets and hardware logic circuitry for producing can test data signals for each can pocket, the can test data representative of leaking cans, unpainted cans and empty can pockets; the hardware logic circuitry for also producing a pocket pulse signal for each can pocket and turret pulse signal for each revolution of the turret; the monitoring device comprising, pocket pulse counter means for assigning a pocket pulse number for the can test data produced for each can pocket; pulse revolution means for resetting the pocket pulse counter means in response to the turret pulse signal; data processing means for accumulating and arranging the can test data into a data array according to a pocket pulse number; data summary means for summarizing can test data in the data array to provide a summary of can test data; data analysis means for analyzing the can test data to provide an analysis of can test data; display means for displaying the summary of can test data and the analysis of can test data to provide information indicating potential problems in can processing and possible malfunction of the can testing machine.

The present invention may also comprise a monitoring device for a can testing machine which has a revolving turret with a plurality of can pockets and hardware logic circuitry for producing can test data signals for each can pocket, the can test data representative of leaking cans, unpainted cans and empty can pockets; the hardware logic circuitry for also producing a pocket pulse signal for each can pocket and turret pulse signal for each revolution of the turret; the monitoring device comprising, pocket pulse counter means for assigning a pocket pulse number for the can test data produced for each can pocket; pulse revolution means for resetting the pocket pulse counter means in response to the turret pulse signal; data processing means for accumulating and arranging the can test data into a data array according to pocket pulse number; data summary means for summarizing the can test data in the data array to provide a summary of can test data in the data array indicating the total number of cans rejected, the total number of leaking cans detected, the total number of unpainted cans detected and the total number of empty can pockets detected for a predetermined period; data analysis means for analyzing the can test data in the data array to provide an analysis of can test data in the data array indicating a high unpainted can rate whenever the total number of unpainted cans detected exceeds a predetermined number in the predetermined period, display of the number of empty can pockets and whether the can-in-pocket sensor needs adjustment and of a high empty can pocket rate whenever the total number of empty can pockets detected exceeds a predetermined number within the predetermined period, a high leaking can rate whenever the total number of leaking cans detected exceeds a predetermined number within the predetermined period, a bad pocket in the can testing machine whenever the number of cans rejected from a particular pocket exceeds a predetermined multiple of the average number of cans rejected from other can pockets, and an excessive scrap rate whenever the percentage of the total number of cans rejected to the total number of cans processed exceeds a predetermined level for the predetermined period; display means for displaying the summary of can test data and the analysis of can test data in response to the data summary means and the data analysis means.

The present invention may also comprise a method for monitoring a can testing machine which has a revolving turret with a plurality of can pockets and hardware logic circuitry for producing can test data signals for each can pocket, the can test data representative of leaking cans, unpainted cans and empty can pockets, the hardware logic circuitry for also producing a pocket pulse signal for each can pocket and turret pulse signal for each revolution of the turret, the method comprising the steps of: assigning a pocket pulse number for the can test data produced for each can pocket; resetting the pocket pulse counter means in response to the turret pulse signal; accumulating and arranging the can test data into a data array according to pocket pulse number; summarizing the can test data in the data array to provide a summary of can test data in the data array indicating the total number of cans rejected, the total number of leaking cans detected, the total number of unpainted cans detected and the total number of empty can pockets detected for a predetermined period; analyzing the can test data in the data array to provide an analysis of can test data in the data array indicating a high unpainted can rate whenever the total number of unpainted cans detected exceeds a predetermined number in the predetermined period, a high empty can pocket rate whenever the total number of empty can pockets detected exceeds a predetermined number within the predetermined period, a high leaking can rate whenever the total number of leaking cans detected exceeds a predetermined number within the predetermined period, a bad pocket in the can testing machine whenever the number of cans rejected from a particular pocket exceeds a predetermined multiple of the average number of cans rejected from other can pockets, and an excessive scrap rate whenever the percentage of the total number of cans rejected to the total number of cans processed exceeds a predetermined level for the predetermined period; displaying the summary of can test data and the analysis of can test data in response to the data summary means and the data analysis means.

The advantages of the device of the present invention are its ability to monitor the operation of the can testing machine to identify potential can production process problems and testing machine problems. The present invention provides a summary of can testing data to indicate the total number of cans processed, the total number of cans rejected, the total number of leaking cans detected, the total number of unpainted cans detected and the total nymber of empty can pockets detected, and provides an analysis of can test data to indicate a high unpainted can rate whenever the total number of unpainted cans detected exceeds a predetermined number, a high empty can pocket rate whenever the total number of empty can pockets detected exceeds a predetermined number, a high leaking can rate whenever the total number of leaking cans detected exceeds a predetermined number, a bad pocket in the can testing machine whenever the number of cans rejected from a particular pocket exceeds a predetermined multiple of the average number of cans rejected from other pockets and an excessive scrap rate whenever the percentage of the total number of cans rejected to the total number of cans processed exceeds a predetermined level. Visual indications of this information is provided on a display screen with data analysis messages indicating the nature of the problem detected and analyzed and a separate visual indication of excessive scrap rate whenever the percentage of the total number of cans rejected to the total number of cans processed exceeds a predetermined level. Thus, the present invention provides a method and apparatus for monitoring and controlling the operation of a container or can testing machine.

BRIEF DESCRIPTION OF THE DRAWINGS

An illustrative and presently preferred embodiment of the invention is shown in the accompanying drawings, wherein.

DETAILED DESCRIPTION OF THE INVENTION

Figure 1:
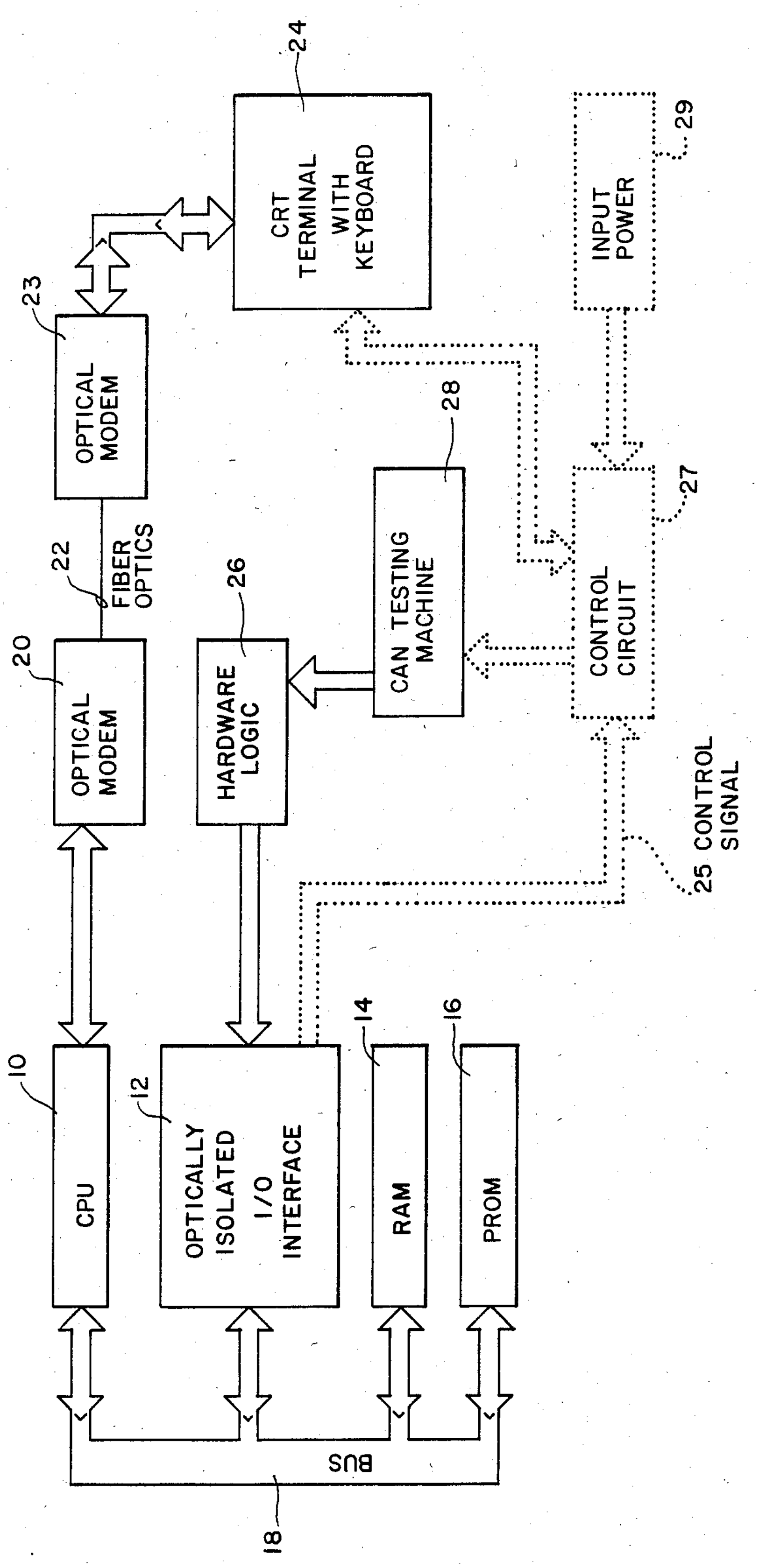
FIG. 1 is a block diagram of the hardware associated with the device of the present invention.

The can testing monitoring system of the present invention is schematically illustrated in the block diagram of FIG. 1. The can testing monitoring device of the present invention utilizes a microcomputer schematically illustrated as central computing unit 10, optically isolated input/output interface 12, random-access-memory 14, and programmable read-only-memory 16. Random access memory 14 and programmable read-only-memory 16 provide additional memory capacity to the central processing unit 10. Bus 18 couples the central processing unit 10, optically isolated input/output interface 12, random-access-memory 14, and programmable read-only-memory 16 in a conventional manner as provided by the microcomputer manufacturer. In accordance with the preferred embodiment of the invention, an INTEL SBC 80/20-4 central processing unit 10 has been used in conjunction with an SBC 556 optically isolated input/output interface 12, SBC 094 4K Cmos random-access-memory 14, and SBC 416 16K programmable read-only-memory 16. The software operating system utilized in conjunction with the microcomputer described above comprises an INTEL iRMX 80 operating system, described in Appendix A.

The INTEL iRMX 80 comprises a real time multitasking software system which provides real time facilities for priority based resource allocation, intertask communications, and other features suitable for test systems. A more complete description of the operating system is provided in Appendix A which comprises a documentation book describing the iRMX 80 program. An additional description of the iRMX 80 program is also given in the Intel Systems Data Catalogue, Jan., 1982, which is hereby incorporated by reference and forms a part of this disclosure for all that it teaches, copies of which can be obtained from the Intel Corporation Literature Department, SB3-3, 3065 Bauers Ave., Santa Clara, Calif. 95051.

Optical modem 20 is coupled to central processing unit 10 to transfer information in a serial fashion over fiberoptics 22 to optical modem 23 for transmission in serial to cathode ray tube terminal and keyboard 24 such as DIGITAL EQUIPMENT CORP. VT100.

Hardware logic 26 is coupled to the computer through optically isolated input/output interface 12 which provides voltage isolation between central processing unit 10 and associated memory 14, 16, and hardware logic 26. The central processing unit 10 comprises a single board computer having programmable read-only-memory and random-access-memory hardware capability. Central processing unit 10 also contains interrupt control circuitry and serial interface circuitry contained in terminal handler 40 disclosed in FIGS. 2 and 3, to couple information through optical modems 20, 23 to the CRT terminal and keyboard (display) 24.

Figure 2:
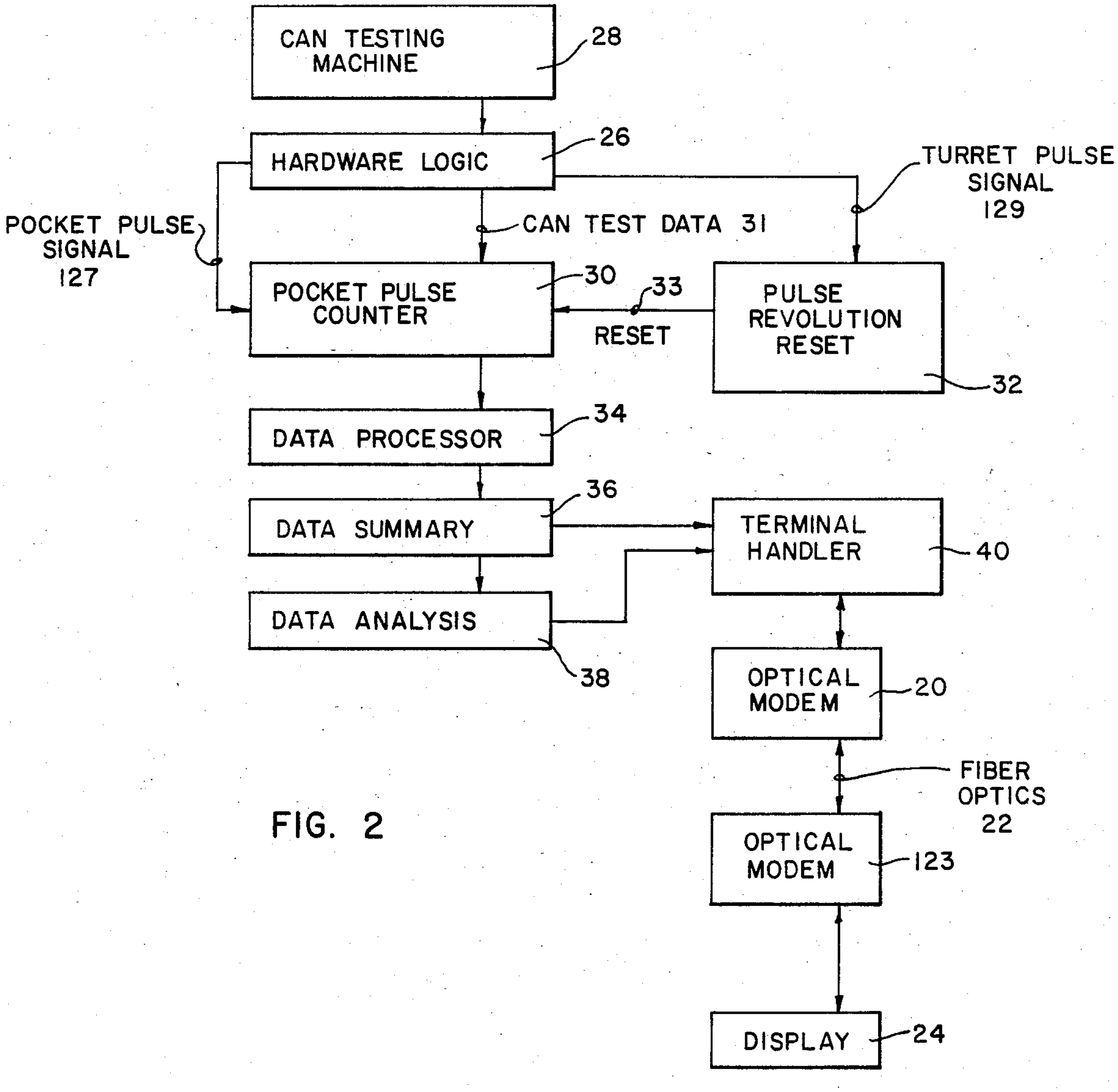
FIG. 2 is a block diagram illustrating the operation of the hardware disclosed in FIG. 1.

FIG. 2 discloses a schematic block diagram of the operational systems of the preferred embodiment. In accordance with the preferred embodiment of the invention, can testing machine 28 has a revolving turret with a plurality of can pockets and hardware logic circuitry 26 for producing can test data signals for each can pocket. Can test data 31 is representative of leaking cans, unpainted cans and empty can pockets. Hardware logic 26 also produces a pocket pulse signal 127 for each can pocket and a turret pulse signal 129 for each revolution of the turret.

Pocket pulse counter means is disclosed for assigning a pocket pulse number for can test data produced for each can pocket. As embodied herein, the pocket pulse means comprises pocket pulse counter 30 disclosed in FIGS. 2 and 3.

Pulse revolution means for resetting the pocket pulse counter means in response to a turret pulse signal 129 is disclosed which is embodied herein as pulse revolution reset device 32 which produces a reset signal 33 applied to the pocket pulse counter 30 in response to turret pulse signal 129.

Figure 3:
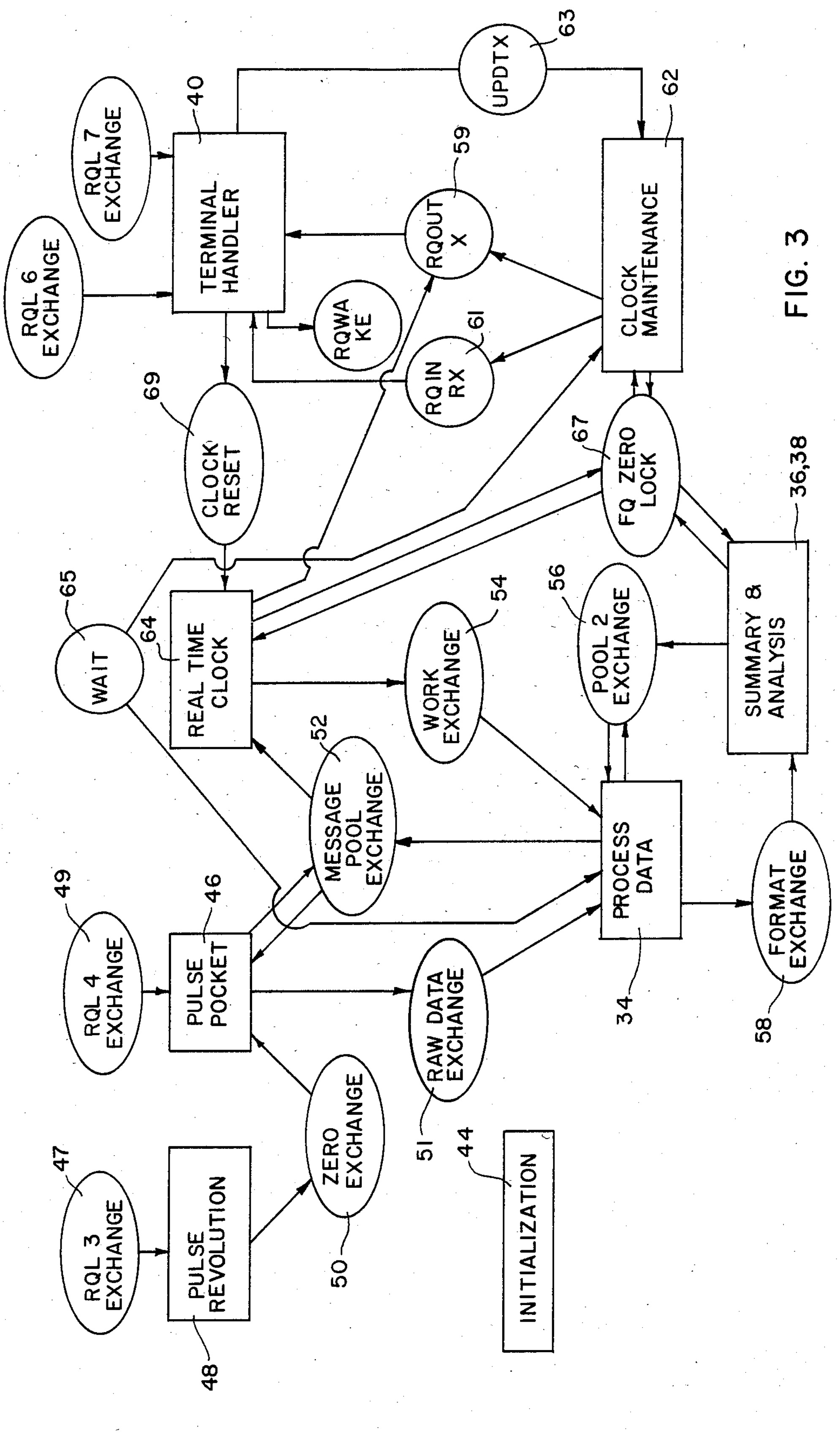
FIG. 3 is a software configuration diagram for the device of the present invention.

Data processing means for accumulating and arranging the can test data into a data array according to pocket pulse number is disclosed, which is embodied herein as data processor 34, disclosed in FIGS. 2 and 3.

Data summary means for summarizing can test data in the data array to provide a summary of can test data is disclosed which is embodied herein as data summary device 36 disclosed in FIGS. 2 and 3.

Data analysis means for analyzing can test data to provide an analysis of can test data in the data array is embodied herein, as data analysis device 38 disclosed in FIG. 2.

Display means for displaying said summary of can test data in said data array and said analysis of can test data in said data array to provide information indicating potential problems in can processing and possible malfunction of the can testing machine is embodied herein as display device 24 disclosed in FIGS. 1 and 2. The display device 24 comprises a CTR terminal and keyboard which is capable of displaying high unpainted can rate messages whenever more than a predetermined number of unpainted cans are detected within a predetermined time interval, a message whenever more than a first predetermined number of empty can pockets are detected within a predetermined time interval to indicate possible track misalignment and an excess production of damaged cans, a message whenever more than a second predetermined number of empty can pockets are detected within a predetermined test interval to indicate worn out infeed parts, misalignment of a can and pocket sensor and misadjustment of can in pocket sensor amplifier circuitry, an excessive leaker reject message whenever the percentage of leaking cans exceeds a predetermined level, and a message which identifies a particular potentially bad can pocket in the revolving turret of the can testing machine whenever the number of rejects from a particular can pocket exceeds a predetermined multiple of the average number of rejects in other can pockets indicating a possible bad flange seal, a misaligned starwheel, a can pocket missing wear surfaces, and a push pad missing wear surfaces, each of these messages generated in means for summarizing and analyzing said can test data, illustrated in FIG. 2 as data summary device 36 and data analysis device 38, and summary and analysis process 36, 38 illustrated in FIG. 3.

Data summary means for summarizing can test data in the data array, provided by data processor 34 is disclosed to provide a summary of can test data in said data array indicating the total number of cans processed, the total number of cans rejected, the total number of leaking cans detected, the total number of unpainted cans detected, and the total number of empty can pockets detected for a predetermined period. Means for summarizing can test data is embodied in data summary device 36.

Data analysis means for analyzing can test data in the data array of data processor 34 is disclosed to provide an analysis of can test data in the data array indicating a high unpainted can rate whenever the total number of unpainted cans detected exceeds a predetermined number in a predetermined period, a high empty can pocket rate whenever the total number of empty can pockets detected exceeds a predetermined number within a predetermined period, a high leaking can rate whenever the total number of leaking cans detected exceeds a predetermined number within a predetermined period, a bad pocket in the can testing machine whenever the number of cans rejected from a particular pocket exceeds a predetermined multiple of the average number of cans rejected in other pockets, and an excessive scrap rate whenever the percentage of the total number of cans rejected to the total number of cans processed exceeds a predetermined level in a predetermined period. Means for analyzing can test data is embodied in data analysis device 38, in accordance with the present invention.

Figure 4:
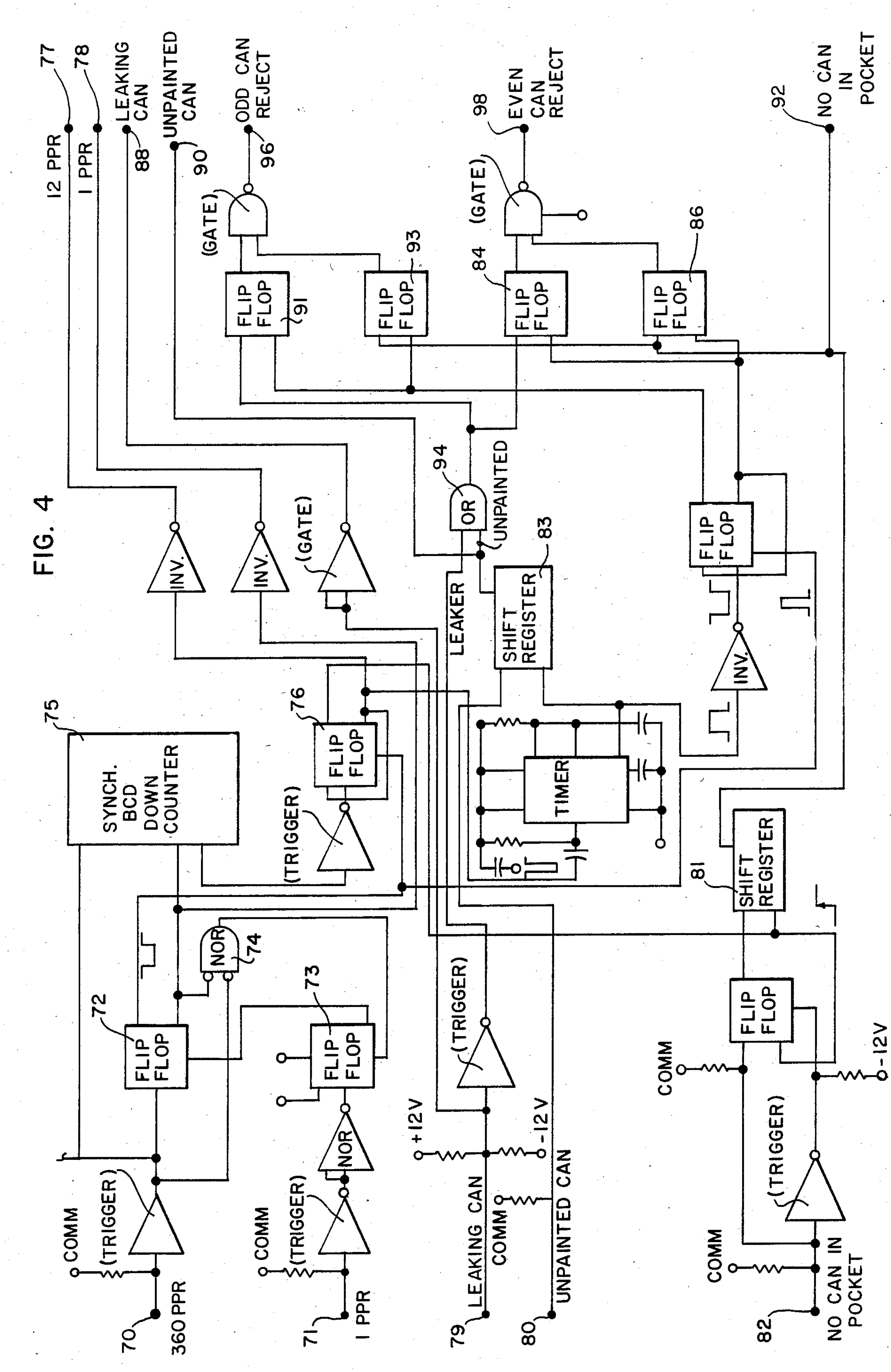
FIG. 4 is a detailed schematic diagram of the hardware logic of the present invention.

In operation, can testing machine 28 produces can data signals which are applied to hardware logic 26 which is more fully disclosed in FIG. 4. Hardware logic 26 functions to produce can test data in parallel format on output line 31 simultaneously with pocket pulse signal 127 which is a self timing signal which occurs each time a can pocket is aligned in the can testing machine. Whenever a turret pulse signal 129 is present, the turret pulse signal 129 is also outputed from hardware logic 26. Turret pulse signal 129 is applied to the pulse revolution reset device 32 to produce a reset signal 33 to restart the pocket pulse counter. Can test data from the pocket pulse counter is then applied to data processor 34 which accumulates and arranges the can test data into a data array according to a pocket pulse number which was assigned in pocket pulse counter 30.

Data summary device 36 functions to summarize the data in the data array produced by data processor 34. The data summarized in the data array is coupled to terminal handler 40 for output to optical modem 20. Summarized data from data summary 36 is applied to data analysis device 38 which analyzes the can test data to provide an indication of a high unpainted can rate whenever the total number of unpainted cans detected exceeds a predetermined number within a predetermined period, to indicate a high empty can pocket rate whenever the total number of empty can pockets detected exceeds a predetermined number within the predetermined period, to indicate a high leaking can rate whenever the total number of leaking cans detected exceeds a predetermined number within the predetermined period, to indicate that a bad pocket in the can testing machine whenever the number of cans rejected in a particular pocket exceeds a predetermined multiple of the average number of cans rejected from other can pockets in a predetermined period, and indicates an excessive scrap rate whenever the percentage of the total number of cans rejected to the total number of cans processed exceeds a predetermined level in a predetermined period.

Data analysis device 38 indicates a bad pocket in the can testing machine whenever the number of cans rejected in a particular pocket exceeds three times the average number of cans rejected in the other pockets in a 15 minute time interval and 2 times the average number of cans rejected from other can pockets in an hourly time period. Similarly, data analysis device 38 indicates an excessive scrap rate whenever the percentage of the total number of cans rejected to the total number of cans processed exceeds 0.55% in accordance with the preferred embodiment of the invention.

Terminal handler 40 transforms the data from data summary 36 and data analysis 38 into a serial format which is acceptable to optical modem 20. Optical modem 20 transfers electrical serial data from the RS232C output of CPU 10 into optical serial data for transmission over fiber optics 22 to optical modem 23 which transforms the optical data into electrical signal data utilized by the display device 24.

Referring to FIG. 3, a software configuration diagram is illustrated for the can testing monitoring device of the preferred embodiment of the invention. As set forth above, the operating program utilized in accordance with the preferred embodiment of the invention comprises the iRMX 80 operating program. The specific program utilized in conjunction with the operating program is schematically illustrated in the software configuration of FIG. 3 which comprises the preferred embodiment for processing and analyzing data in accordance with the present invention by the central processing unit 10, optically isolated input/output interface 12, random excess memory 14, and programable read-only-memory 16, illustrated in FIG. 1. The program listing of the software configuration of FIG. 3, is set forth in Appendix B.

In operation, the software configuration illustrated in FIG. 3 is started by initialization task 44 which functions to set up the hardware of the microcomputer and specify the manner in which the hardware is going to perform the various tasks of the program. The pulse pocket task 46 waits for a message from the RQL 4 exchange 49 indicating that a pulse pocket is aligned in the can testing machine. This information is provided from the optically isolated input/output interface 12 from hardware logic 26, illustrated in FIG. 1. The RQL 3 exchange 47 posts a 5 byte interrupt message whenever the turret of the can testing machine has made one revolution. The pulse revolution task 48 subsequently posts a message on the zero exchange 50 to reset the pulse pocket task to zero. Since there are 12 can pockets in the turret of the device of the preferred embodiment of the invention, the zero exchange message indicates that the turret is between can pockets 1 and 12. After the pulse pocket task 46 receives the reset signal from zero exchange 50, pulse pocket task 46 waits at RQL 4 exchange 49 for further pulse pocket messages.

For each set of can test data for which a can pocket number has been assigned by the pulse pocket task 46, a blank message is retrieved from message pool 52. This data is deposited in raw data exchange 51 indicating the pocket number and the status of the can in that pocket, i.e. whether the can was detected as leaking, unpainted or whether the can pocket was empty. Process data task 34 retrieves the data from the raw data exchange 51 and formulates a data array of the three can test data criteria detected for each can pocket. As the can test data is shifted from the raw data exchange into the process data task 34, the three criteria for each can pocket is added for a predetermined period. In accordance with the present invention, the predetermined period has been set at 15 minutes.

Each time the raw data exchange 51 deposits a message in the process data task, the empty message is placed back in the message pool 52 for further use. The three can test data criteria are placed in the data array which is stored in the buffer of the process data task 34 in accordance with the assigned can pocket number. This array of 3×12 is accumulated for the predetermined 15 minute interval until a message is received from a work exchange 54 indicating that the fifteen minute interval has elapsed.

Upon receiving a message from the work exchange 54, the process data task picks up a blank message from the pool 2 exchange 56, and deposits the data array stored in the buffer of the process data task 34 into format exchange 58. Upon shifting the data array to format exchange 58, the buffer of process data task 34 is zeroed out.

The data array is then received by summary and analysis task 36, 38 which stores the data array and sums successive data arrays into an hourly data array. Summary and analysis task 36, 38 then performs the various operations of summary and analysis set forth above and in the enclosed program listing of Appendix B. For example, the summary analysis task provides a summary of can test data from the data array indicating the total number of cans processed, the total number of cans rejected, the total number of leaking cans detected, the total number of unpainted cans detected and the total number of empty can pockets detected during the predetermined 15 minute interval. In addition, the summary and analysis task 36, 38 provides an analysis of can test data in the data array indicating a high unpainted can rate whenever the total number of unpainted cans detected exceeds 10 in the predetermined 15 minute interval, a high empty can pocket rate whenever the total number of empty can pockets detected exceeds 50 indicating infeed tract jams, and from 1 to 50 indicating the necessity for adjustment of the can-in-pocket sensor, a high leaking can rate whenever the total number of leaking cans detected exceeds 0.55% of the total number of cans processed, a bad pocket whenever the number of cans rejected from a particular pocket exceeds 3 times the average number of cans rejected in other pockets during the predetermined 15 minute interval and 2 times the average number of cans rejected in other can pockets during an hourly interval, and an excessive scrap rate whenever the percentage of the total number of cans rejected to the total number of cans processed exceeds 0.55%. In addition to providing the above analysis, summary and analysis task 36, 38 provides a format for writing out the data which has been summarized and analyzed in the summary and analysis task 36, 38 on the display 24. Additionally, summary and analysis task 36, 38 can also be easily programmed to produce a control signal 25 whenever any of the above rates are indicated or any predetermined rate is indicated so as to activate a control circuit 27 to automatically turn off the can testing machine 28, as illustrated in dotted lines in FIG. 1. Manual actuation can also be provided for responding to predetermined criteria to adjust machine operation.

Real time clock 64 waits at the wait exchange 65 for one minute and if no messages are received, real time clock 64 updates the time of day by one minute. Real time clock task 64 also checks to see if a predetermined interval has elapsed. If an interval has elapsed, the real time clock task 64 sends a message to work exchange 54 indicating that a 15 minute interval has elapsed.

Clock maintenance task 62 functions to set the time of day from the keyboard and real time clock task 64 by way of the FQ zero lock exchange 67, RQINRX 61, RQOUTX 59 and UPDTX 63. The FQ zero lock exchange 67 interfaces the Fortran and PLM 80 languages utilized in the device of the present invention. Terminal handler 40 and the associated exchanges illustrated in FIG. 3 function to place the data which has been summarized and analyzed, in a form for transmission over optical modems 20 and 23, as illustrated in FIG. 2. This is accomplished in accordance with the operating system (iRMX 80) disclosed in Appendix A.

The above disclosure provides a description of the manner of operation of the software configuration illustrated in FIG. 3. Appendix B comprises the program listing of software utilized in accordance with the present invention. Of course, the program of Appendix B merely constitutes an example of a particular manner of implementing the objectives of the present invention. Any suitable program which could be designed to meet these objectives can be utilized to practice the present invention.

FIG. 4 comprises a schematic diagram of hardware logic 26. Hardware logic 26 comprises a interface between the can testing machine 28 and the microcomputer utilized in the present invention. The can testing machine produces an output 70 which comprises 360 pulses per revolution of the turret of the can testing machine. Similarly, the can testing machine produces output 71 which comprises one pulse per revolution of the turret of the can testing machine. Flip flops 72 and 73, nor-gate 74 and synchronous BCD downcounter 75, in combination with flip flop 76 produce output clocking pulse 77 which is representative of 12 pulses per revolution of the turret of the can testing machine from the combination of input clocking signals 70 and 71. Flip flops 72 and 73 in combination with nor-gate 74 produce output clocking pulse 78 which is representative of 1 pulse per revolution of the turret of the can testing machine, from the combination of input clocking signals 70 and 71. Inputs 79, 80 and 82 from the can testing machine comprise signals representative of detection of a leaking can, an unpainted can, and no can in a pocket, respectively.

Since these signals are produced at the output of the can testing machine at different times for each can pocket, it is desirable to present the can test data, i.e. the data indicating leaking cans, unpainted cans, and no cans in a pocket, in parallel format, simultaneously. The circuitry of FIG. 4 utilizes shift registers 81 and 83 to insure that can test data at outputs 88 and 90 and 92 are presented simultaneously. Additionally, the hardware logic of FIG. 4 utilizes or-gate 94 in conjunction with flip flops 84, 86, 91, 93 to provide an odd can reject signal 96 and an even can reject signal 98. These control signals are utilized in the can testing machine to activate solenoids to reject cans using air pressure. An odd/even system is utilized due to the response time of the solenoids. In this manner, the hardware logic disclosed in FIG. 4 provides the necessary clock pulse signals on outputs 77 and 78 and can test data on outputs 88, 90 and 92, as well as providing control signals for the can testing apparatus.

Consequently, the present invention provides a device and method for monitoring a can testing machine which is capable of identifying potential can production process problems as well as problems existing within the can testing machine. The present invention provides a summary of the can testing data as well as an analysis of the can testing data to aid in the identification of can production and can testing problems. Visual indications of this information are provided on a display screen with data analysis messages indicating the nature of the problem detected and analyzed with a separate visual indication of excessive scrap rate whenever the percentage of the total number of cans rejected to the total number of cans processed exceeds a predetermined level of acceptability. Data produced by the present invention can be used to produce a control signal to stop the can testing machine if the scrap rate exceeds predetermined levels. Adjustment of said can testing machine is subsequently made either automatically or manually in accordance with the analysis of can test data.

The foregoing description of the invention has been presented for purposes of illustration and description. It is not intended to be exhaustive or to limit the invention to precise form disclosed, and other modifications and variations may be possible in light of the above teachings. The embodiment was chosen and described in order to best explain the principals of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A monitoring device for a container testing machine of the type which generates container test data which is properly indicative of potential container production process problems during a normal testing machine operating state and which generates container test data erroneously indicative of potential container production process problems during a defective testing machine operating state and wherein the normal or abnormal operation of the testing machine is ordinarily not readily ascertainable by operating personnel, comprising:

data accumulation means for accumulating container test data produced by said container testing machine;

data analysis means for analyzing said container test data for determining whether said testing machine is in said normal operating state or said defective operating state and for identifying both potential container production process problems and potential container testing machine problems;

display means for displaying accumulated data produced by said data accumulated means and analysis data produced by said data analysis means to identify potential container production process problems and container testing machine problems.

2. The monitoring device of claim 1 wherein said container testing machine comprises a can testing machine.

3. A monitoring device for a can testing machine which has a revolving turret with a plurality of can pockets and hardware logic circuitry for producing can test data signals for each can pocket, said can test data representative of leaking cans, unpainted cans and empty can pockets; said hardware logic circuitry for also producing a pocket pulse signal for each can pocket and turret pulse signal for each revolution of said turret, said monitoring device comprising:

pocket pulse counter means for assigning a pocket pulse number for said can test data produced for each can pocket;

pulse revolution means for resetting said pocket pulse counter means in response to said turret pulse signal;

data processing means for accumulating and arranging said can test data into a data array according to a pocket pulse number;

data summary means for summarizing can test data in said data array to provide a summary of can test data;

data analysis means for analyzing said can test data to provide an analysis of can test data;

display means for displaying said summary of can test data and said analysis of can test data to provide information indicating potential problems in can processing and possible malfunction of said can testing machine.

4. The device of claim 3 wherein said display means further comprises:

means for displaying a high unpainted can rate message whenever more than a predetermined number of said unpainted cans are detected within a predetermined time interval.

5. The device of claim 3 wherein said display means further comprises:

means for displaying a message whenever more than a first predetermined number of said empty can pockets are detected within a predetermined time interval to indicate possible track misalignment and an excess production of damaged cans.

6. The device of claim 3 wherein said display means further comprises:

means for displaying a message whenever more than a second predetermined number of said empty can pockets are detected within a predetermined test interval to indicate worn out infeed parts, misalignment of can-in-pocket sensor amplifier circuitry.

7. The device of claim 3 wherein said display means further comprises:

means for displaying an excessive leaker reject message whenever the percentage of leaking cans exceeds a predetermined level.

8. The device of claim 3 wherein said display means further comprises:

means for displaying a message which identifies a particular potentially bad can pocket in said revolving turret whenever the number of rejects from said particular can pocket exceeds a predetermined multiple of the average number of rejects in other can pockets indicating a possible bad flange seal, a misaligned starwheel, a can pocket missing wear surfaces and a pushpad missing wear surfaces.

9. The device of claim 3 wherein said display means further comprises:

means for displaying a high unpainted can rate message whenever more than a predetermined number of said unpainted cans are detected within a predetermined time interval;

means for displaying a message whenever more than a first predetermined number of said empty can pockets are detected within a predetermined time interval to indicate possible track misalignment and an excess production of damaged cans;

means for displaying a message whenever more than a second predetermined number of said empty can pockets are detected within a predetermined test interval to indicate worn out infeed parts, misalignment of a can-in-pocket sensor amplifier circuitry;

means for displaying an excessive leaker reject message whenever the percentage of leaking cans exceeds a predetermined level;

means for displaying a message which identifies a particular potentially bad can pocket in said revolving starwheel whenever the number of rejects from said particular can pocket exceeds a predetermined multiple of the average number of rejects in other can pockets indicating a possible bad flange seal, a misaligned starwheel, a can pocket missing wear surfaces and a pushpad missing wear surfaces.

10. A monitoring device for a can testing machine which has a revolving turret with a plurality of can pockets and hardware logic circuitry for producing can test data signals for each can pocket, said can test data representative of leaking cans, unpainted cans and empty can pockets, said hardware logic circuitry for also producing a pocket pulse signal for each can pocket and turret pulse signal for each revolution of said turret, said monitoring device comprising:

pocket pulse counter means for assigning a pocket pulse number for said can test data produced for each can pocket;

pulse revolution means for resetting said pocket pulse counter means in response to said turret pulse signal;

data processing means for accumulating and arranging said can test data into a data array according to pocket pulse number;

data summary means for summarizing said can test data in said data array to provide a summary of can test data in said data array indicating the total number of cans rejected, the total number of leaking cans detected, the total number of unpainted cans detected and the total number of empty can pockets detected for a predetermined period;

data analysis means for analyzing said can test data in said data array to provide an analysis of can test data in said data array indicating a high unpainted can rate whenever said total number of unpainted cans detected exceeds a predetermined number in said predetermined period, a high empty can pocket rate whenever said total number of empty can pockets detected exceeds a predetermined number within said predetermined period, a high leaking can rate whenever said total number of leaking cans detected exceeds a predetermined number within said predetermined period, a bad pocket in said can testing machine whenever the number of cans rejected from a particular pocket exceeds a predetermined multiple of the average number of cans rejected from other can pockets, and an excessive scrap rate whenever the percentage of said total number of cans rejected to said total number of cans processed exceeds a predetermined level for said predetermined period;

display means for displaying said summary of can test data and said analysis of can test data in response to said data summary means and said data analysis means;

means for controlling the operation of the machine in response to said data analysis means.

11. A method for monitoring for the purpose of correcting the operation of a can testing machine which has a revolving turret with a plurality of can pockets and hardware logic circuitry for producing can test data signals for each can pocket, said can test data representative of leaking cans, unpainted cans and empty can pockets, said hardware logic circuitry for also producing a pocket pulse signal for each can pocket and turret pulse signal for each revolution of said turret, said method comprising the steps of:

assigning a pocket pulse number for said can test data produced for each can pocket;

resetting said pocket pulse counter means in response to said turret pulse signal;

accumulating and arranging said can test data into a data array according to pocket pulse number;

summarizing said can test data in said data array to provide a summary of can test data in said data array indicating the total number of cans rejected, the total number of leaking cans detected, the total number of unpainted cans detected and the total number of empty can pockets detected for a predetermined period;

analyzing said can test data in said data array to provide an analysis of can test data in said data array indicating a high unpainted can rate whenever said total number of unpainted cans detected exceeds a predetermined number in said predetermined period, a high empty can pocket rate whenever said total number of empty can pockets detected exceeds a predetermined number within said predetermined period, a high leaking can rate whenever said total number of leaking cans detected exceeds a predetermined number within said predetermined period, a bad pocket in said can testing machine whenever the number of cans rejected from a particular pocket exceeds a predetermined multiple of the average number of cans rejected from other can pockets, and an excessive scrap rate whenever the percentage of said total number of cans rejected to said total number of cans processed exceeds a predetermined level for said predetermined period; adjusting the operation of the machine in accordance with said summary of can test data and said analysis of can test data.

* * * * *